(12) United States Patent
Park et al.

(10) Patent No.: US 12,483,798 B2
(45) Date of Patent: Nov. 25, 2025

(54) ELECTRONIC DEVICE INCLUDING CAMERA AND OPERATION METHOD OF ELECTRONIC DEVICE

(71) Applicant: Samsung Electronics Co., Ltd., Suwon-si (KR)

(72) Inventors: Sunmin Park, Suwon-si (KR); Donghyun Yeom, Suwon-si (KR); Minwoo Lee, Suwon-si (KR); Jaekeun Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 18/486,741

(22) Filed: Oct. 13, 2023

(65) Prior Publication Data

US 2024/0040265 A1    Feb. 1, 2024

Related U.S. Application Data

(63) Continuation of application No. PCT/KR2022/005353, filed on Apr. 13, 2022.

(30) Foreign Application Priority Data

Apr. 14, 2021    (KR) ........................ 10-2021-0048602

(51) Int. Cl.
*H04N 23/74*    (2023.01)
*G09G 5/10*    (2006.01)
(Continued)

(52) U.S. Cl.
CPC ............... *H04N 23/74* (2023.01); *G09G 5/10* (2013.01); *H04N 23/57* (2023.01); *H04N 23/72* (2023.01);
(Continued)

(58) Field of Classification Search
CPC ........ H04N 23/74; H04N 23/57; H04N 23/72; H04N 23/73; H04N 23/53; H04N 23/62;
(Continued)

(56) References Cited

U.S. PATENT DOCUMENTS

2007/0002130 A1    1/2007    Hartkop
2009/0102763 A1    4/2009    Border et al.
(Continued)

FOREIGN PATENT DOCUMENTS

JP    2017-212533 A    11/2017
JP    2018-124457 A    8/2018
(Continued)

OTHER PUBLICATIONS

WO 2019213839 Translation (Year: 2019).*
(Continued)

*Primary Examiner* — Sinh Tran
*Assistant Examiner* — Angel L Garces-Rivera
(74) *Attorney, Agent, or Firm* — Jefferson IP Law, LLP

(57) ABSTRACT

An electronic device including a camera and an operation method of the electronic device are provided. The electronic device includes display circuitry, a camera disposed on a rear surface of the display circuitry, a memory, and at least one processor electrically connected to the display circuitry, the camera, and the memory and being configured to identify camera driving information set for the camera, identify a shutter speed included in the set camera driving information, change set display driving information such that a time of a non-emission interval of the duty cycle of the display circuitry is greater than the shutter speed, and based on the changed display driving information, control a driving of the camera.

20 Claims, 14 Drawing Sheets

(51) Int. Cl.
*H04N 23/57* (2023.01)
*H04N 23/72* (2023.01)
*H04N 23/73* (2023.01)

(52) U.S. Cl.
CPC ..... *H04N 23/73* (2023.01); *G09G 2320/0686* (2013.01); *G09G 2354/00* (2013.01)

(58) Field of Classification Search
CPC .. H04N 23/63; G09G 5/10; G09G 2320/0686; G09G 2354/00; G09G 2340/0435; G09G 5/12

See application file for complete search history.

(56) References Cited

U.S. PATENT DOCUMENTS

| | | | |
|---|---|---|---|
| 2012/0162490 A1* | 6/2012 | Chung | H04N 23/631 348/E5.037 |
| 2013/0182062 A1 | 7/2013 | Son et al. | |
| 2015/0049165 A1 | 2/2015 | Choi | |
| 2015/0271392 A1 | 9/2015 | Musgrave et al. | |
| 2017/0343921 A1 | 11/2017 | Yamaguchi et al. | |
| 2020/0195764 A1 | 6/2020 | Xu et al. | |

FOREIGN PATENT DOCUMENTS

| | | |
|---|---|---|
| KR | 10-2010-0088680 A | 8/2010 |
| KR | 10-2012-0071963 A | 7/2012 |
| KR | 10-2013-0016685 A | 2/2013 |
| KR | 10-2013-0083153 A | 7/2013 |
| KR | 10-1462351 B1 | 11/2014 |
| KR | 10-2018-0043643 A | 4/2018 |
| KR | 10-2020-0014408 A | 2/2020 |
| WO | 2015/116217 A1 | 8/2015 |
| WO | 2019/213839 A1 | 11/2019 |
| WO | 2020/180304 A1 | 9/2020 |

OTHER PUBLICATIONS

Extended European Search report dated Aug. 26, 2024, issued in European Application No. 22788438.4-1207.
International Search Report and written opinion dated Jul. 12, 2022, issued in International Patent Application No. PCT/KR2022/005353.
Korean Office Action dated Feb. 20, 2025, issued in Korean Application No. 10-2021-0048602.

* cited by examiner

ELECTRONIC DEVICE INCLUDING CAMERA AND OPERATION METHOD OF ELECTRONIC DEVICE

CROSS-REFERENCE TO RELATED APPLICATION(S)

This application is a continuation application, claiming priority under § 365(c), of an International application No. PCT/KR2022/005353, filed on Apr. 13, 2022, which is based on and claims the benefit of a Korean patent application number filed on Apr. 14, 2021, in the Korean Intellectual Property Office, the disclosure of which is incorporated by reference herein in its entirety.

BACKGROUND

1. Field

The disclosure relates to an electronic device including a camera, and a method for operating the electronic device.

2. Description of Related Art

Recently, electronic devices have been developed in various types for user convenience, and various services or functions are provided.

An electronic device may be implemented to have a hole bored through the upper end of a display such that a front camera is disposed in a hole display type, or to have a camera sensor disposed on the left or right side in a notch display type.

Electronic devices have recently been implemented to expand the display screen by utilizing exposed regions of the display to the maximum extent, while reducing the display bezel, in order to effectively display content and information related to execution of various services or functions and to enhance immersive experiences of users. To this end, electronic devices may be implemented to include an under display camera (UDC) such that a front camera is mounted under the display panel, instead of the notch or hole display type. The corresponding portion of the display may be deactivated only when the UDC is activated such that light is transmitted to the camera lens.

The above information is presented as background information only to assist with an understanding of the disclosure. No determination has been made, and no assertion is made, as to whether any of the above might be applicable as prior art with regard to the disclosure.

SUMMARY

Conventional electronic devices have a UDC disposed under a display panel, thereby making it difficult to secure a sufficient amount of light, and influence may be caused by light occurring in the display panel when capturing an image through the UDC. Accordingly, the quality of images captured through the UDC of conventional electronic devices may be degraded.

Aspects of the disclosure are to address at least the above-mentioned problems and/or disadvantages and to provide at least the advantages described below. Accordingly, an aspect of the disclosure is to provide an electronic device including a camera such that images are captured through a UDC without interference of light occurring in a display panel, and a method for operating the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes display circuitry, a camera disposed on a rear surface of the display circuitry, a memory, and at least one processor electrically connected to the display circuitry, the camera, and the memory and being configured to identify camera driving information set with regard to the camera, identify a shutter speed included in the set camera driving information, change set display driving information such that a time of a non-light-emitting interval of a duty cycle of the display circuitry is larger than the shutter speed, and based on the changed display driving information, control a driving of the camera.

In accordance with another aspect of the disclosure, a method for operating an electronic device is provided. The method includes identifying camera driving information set with regard to a camera disposed on a rear surface of display circuitry of the electronic device, identifying a shutter speed included in the set camera driving information, changing set display driving information such that a time of a non-light-emitting interval of a duty cycle of the display circuitry is larger than the shutter speed, and based on the changed display driving information, controlling a driving of the camera.

In accordance with another aspect of the disclosure, a non-transitory computer-readable storage medium may have one or more programs stored therein is provided. The one or more programs includes executable instructions which, when executed by a processor of an electronic device, cause the electronic device to execute operations including identifying camera driving information set with regard to a camera disposed on a rear surface of display circuitry of the electronic device, identifying a shutter speed included in the set camera driving information, changing set display driving information such that a time of a non-light-emitting interval of a duty cycle of the display circuitry is larger than the shutter speed, and based on the changed display driving information, controlling a driving of the camera.

According to an embodiment of the disclosure, an electronic device may capture images through a UDC without interference of light occurring in a display panel, may improve the quality of images captured through the UDC, and may use the entire visible display region with no sense of difference by removing light interference of effective pixels of the display panel.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
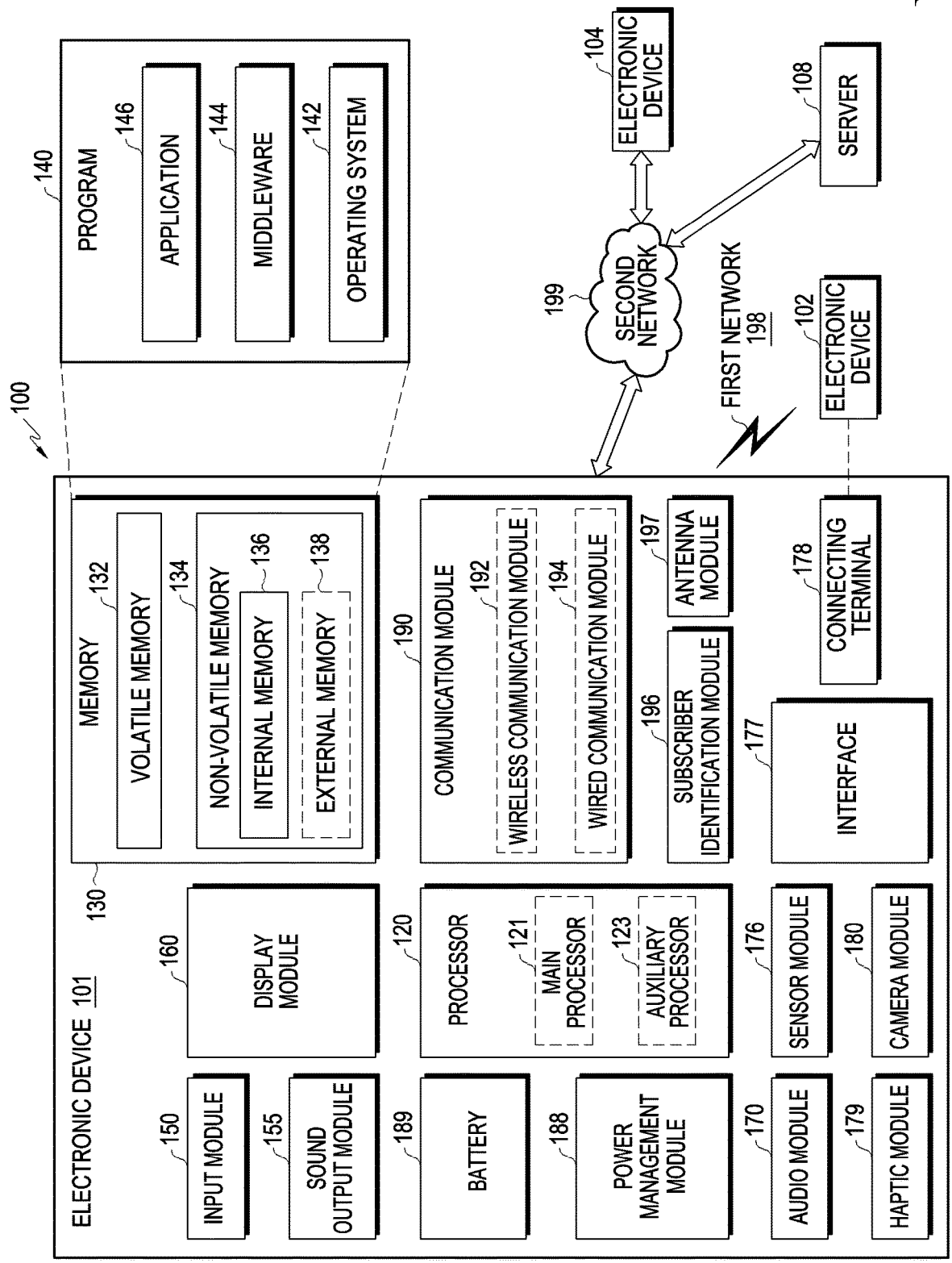
FIG. 1 is a block diagram of an electronic device inside a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g., electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultralow-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
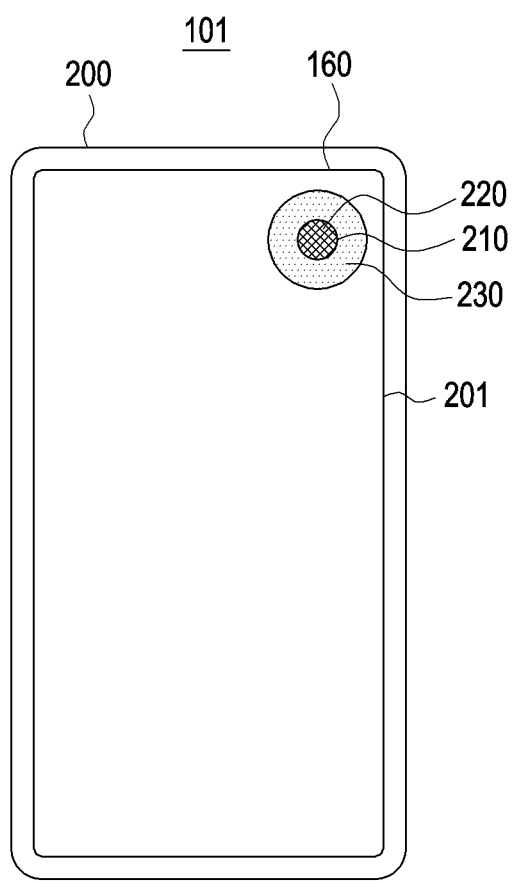
FIG. 2 illustrates an electronic device according to an embodiment of the disclosure.

FIG. 2 illustrates an electronic device according to an embodiment of the disclosure.

Figure 3:
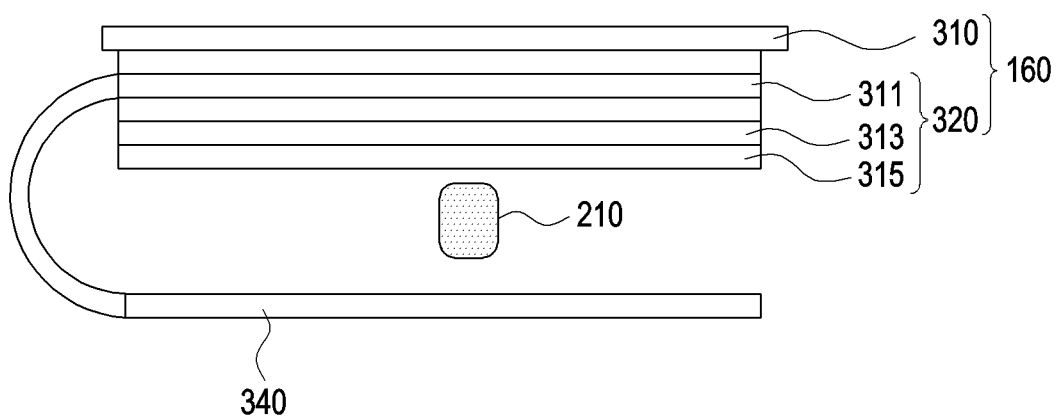
FIG. 3 illustrates an electronic device according to an embodiment of the disclosure.

FIG. 3 illustrates an electronic device according to an embodiment of the disclosure.

Figure 4A:
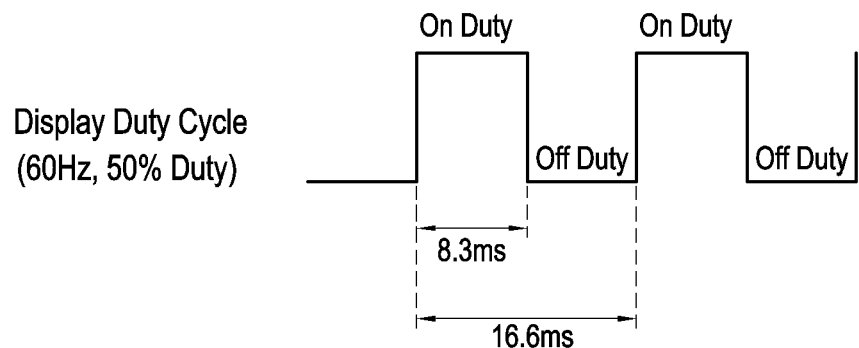
FIGS. 4A and 4B illustrate examples of a duty cycle and a camera driving cycle in an electronic device according to various embodiments of the disclosure.
Figure 4B:
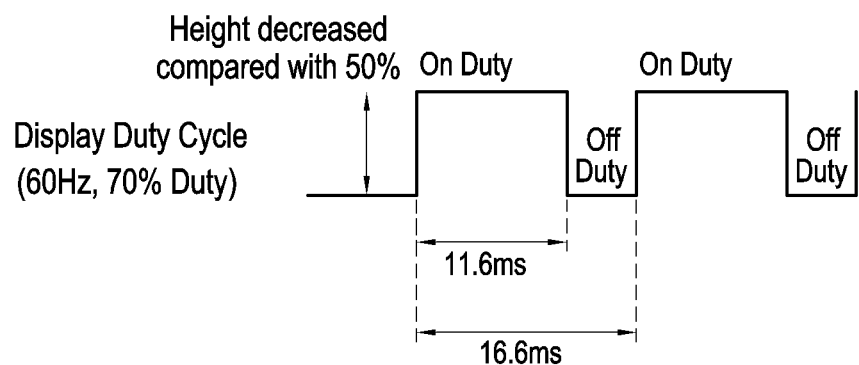

FIGS. 4A and 4B illustrate examples of a duty cycle and a camera driving cycle in an electronic device according to various embodiments of the disclosure.

Referring to FIGS. 1 and 2, an electronic device 101 (for example, the electronic device 101 in FIG. 1) according to an embodiment may include a display module 160 (for example, the display module 160 in FIG. 1) disposed on a front surface 201 of a housing 200, and a camera 210 (for example, the camera module 180 in FIG. 1). The electronic device 101 according to an embodiment may include a memory 130 and at least one processor 120 electrically connected to the display module 160, the camera 210, and the memory 130. In addition, the electronic device 101 according to an embodiment may further include other components described with reference to FIG. 1.

Referring to FIG. 3, according to an embodiment, the display module 160 may be disposed on the front surface 201 of the housing 200 to be exposed, a window 310 may be disposed such that the first surface thereof is exposed, and a display panel 320 may be disposed under the second surface (back surface) of the window 310. The display panel 320 may include a substrate (for example, a flexible printed circuit board (FPCB)) 340 and a display element layer 311 disposed on the substrate 340. The display panel 320 may include a touch sensitive panel (TSP). The display element layer 311 may include a circuit layer including a thin film transistor (TFT) (not illustrated), an organic light emitting diode (OLED) (not illustrated) as a display element, and an insulating layer (IL) therebetween. The display panel 320 may include a display driver integrated circuit (not illustrated). According to an embodiment, at least a part of each of the transparent glass layer (e.g., the window 310) and the display panel 320 may have a bent shape, and the display panel 320 may be made of a flexible polymer film and may include, for example, polyimide, polyethylene terephthalate, or other polymer material. The display panel 320 may include a first polymer layer 313 (for example, polyimide) and a second polymer layer 315 (for example, polyethylene terephthalate), which are disposed under the display element layer 311.

According to an embodiment, the camera 210 may be disposed under the back surface (for example, second surface) of the display module 160, which is not exposed to the outside. As illustrated in FIG. 3, the camera 210 may be an under display camera (UDC) 210 configured such that at least a part of the camera module 180 is disposed under the display panel 320. The camera 210 may be disposed between the display panel 320 and the substrate 340. For example, the camera 210 may be at least a part of the camera module 180 in FIG. 1, and may be included inside the housing 200 so as not to be exposed. The camera 210 may include at least one of a camera sensor (for example, an image sensor) (not illustrated) configured to sense light incident through the window 310 through a lens and convert the light into digital signals, thereby acquiring images, an image processing module (not illustrated) configured to process images, or a memory (not illustrated) configured to store images.

Referring to FIGS. 1, 2, and 3, a processor 120 of an electronic device 101 according to an embodiment may adaptively apply camera driving information and/or display driving information according to the situation or environment so as to eliminate light interference occurring when light leaking inside the display module 160 enters the lens of the camera 210. For example, the camera driving information may include at least one of a shutter speed related to driving of the camera 210, an International Organization for Standardization (ISO) sensitivity, or an aperture value (F). The camera driving information may include various other parameters related to driving of the camera 210. For example, the display driving information may include a refresh rate related to duty cycle determination, and a duty rate. The display driving information may include various other parameters related to driving of the display module 160. A duty cycle may refer to a method for describing, when one frame is displayed (for example, in the case of 60 hertz (Hz), one frame is displayed for 1/60 second), how many light emissions one frame is divided into and then displayed (for example, 2 duty: on, off, 4 duty: on, off, on, off). A duty ratio may refer to a ratio between an on-duty time (for example, light-emitting time) for screen display and an off-duty time (for example, non-light-emitting time). A refresh rate may refer to the number of times the display screen can be output for one second, and may also be referred to as a screen scan rate or a refresh frequency. The unit of the refresh rate is hertz (Hz), and the larger the hertz number, the higher the refresh rate may be.

According to an embodiment, the processor 120 may use the duty cycle of the display module 160 when capturing an image by using the camera 210. During the duty cycle, as illustrated in FIGS. 4A and 4B, an on duty and an off duty of each pixel of the display panel 320 may occur regularly according to display driving information (for example, a screen refresh rate, a duty cycle, and/or a duty ratio). For example, if the duty ratio increases to a ratio (for example, 70%) higher than a designated ratio (for example, 50%), the on-duty time may increase (for example, 11.6 ms), while the off-duty time may decrease (for example, 5 ms), as illustrated in FIG. 4B. The on-duty time may increase as the pitch value (amplitude) decreases, as in FIG. 4B, such that the intensity of emitted light may be identical to the size of the on-duty area. The on-duty interval of the duty cycle may correspond to a light-emitting interval in which the display module 160 emits light. If an image is captured during the on-duty time, the quality of the captured image may be degraded by light interference occurring when light emitted by the display module 160 is received by the image sensor of the camera 210. The off-duty interval of the duty cycle may correspond to a non-light-emitting interval in which the display modules 160 emits no light. The processor 120 may control the camera 210 such that an image can be captured during the off-duty time of pixels, and may adjust variable elements (for example, camera driving information or display driving information) conforming to the situation or environment. Hereinafter, the off-duty time will be referred to as a time during a non-light-emitting interval, and the on-duty time will be referred to as a time during a light-emitting interval, for convenience of description.

According to an embodiment, the processor 120 may acquire camera driving information determined optimally according to the operating mode of the camera 210 at a timepoint at which an image is to be captured, and may identify a shutter speed of the camera 210 included in the camera driving information. The processor 120 may identify display driving information set in the display module 160. For example, the processor 120 may identify that the shutter speed of the camera 210 is 1/60 (16.7 ms), may identify that a refresh rate included in the set display driving information is 120 Hz, and may identify that the duty ratio of the duty cycle is 50%.

According to an embodiment, the processor 120 may compare the identified shutter speed value and the value of the off-duty time of the duty cycle, thereby confirming whether the shutter speed is longer than the off-duty time. If the shutter speed is longer than the off-duty time, image capture by the camera 210 partially occurs in a light-emitting interval, and a part of the capture image may thus undergo light interference by the display module 160. In order to prevent this, the processor 120 may change the display driving information, based on the camera driving information, such that, if the shutter speed is longer than the off-duty time, the camera 210 operates only during the off-duty time (interval in which no light interference occurs).

According to an embodiment, the processor 120 may change the display driving information such that the off-duty time of the duty cycle of the display module 160 becomes longer than the shutter speed. The processor 120 may change the refresh rate such that the shutter speed can operate during the off-duty time while maintaining a necessary camera parameter (for example, at least one of the shutter speed, the ISO, or the aperture value) included in the camera driving information. For example, the set refresh rate may be decreased from 120 Hz to 30 Hz, based on the shutter speed (for example, 1/60 (16.7 ms)). The processor 120 may decrease the refresh rate to 30 Hz such that the off-duty time becomes equal to or longer than the shutter speed (for example, 1/60 (16.7 ms)) in one period of the duty cycle. The total light-emitting area on duty may be identical.

According to an embodiment, the processor 120 may configure the image capture timing of the camera 210 during the off-duty time or change the set image capture timing, and may provide a synchronization signal for synchronization between the display module 160 and the camera 210 to each of the display module 160 and the camera 210. The synchronization signal may be generated based on information regarding the off-duty time and the image capture timing. For example, the processor 120 may simultaneously provide each of the display module 160 and the camera 210 with a synchronization signal for timing an image capture timepoint such that, if an input requesting image capture by the camera 210 is received in an on-duty interval, the camera 210 stands by without capturing an image and then starts capturing an image at a set or changed image capture timing during the off-duty time. According to an embodiment, the processor 120 may control the camera 210 of the camera module 180 so as to capture an image at the set shutter speed during the off-duty time, based on the changed display driving information. For example, the processor 120 may acquire an image captured by the camera 210 during the off-duty time increased to/beyond the shutter speed (for example, 1/60 (16.7 ms)) as the refresh rate is decreased to 30 Hz.

According to an embodiment, the processor 120 may confirm whether to maintain the display driving information set in the display module 160. If the display driving information is deemed to be changed, the processor 120 may control camera driving, based on the set display driving information and the set camera driving information. For example, if the display driving information is deemed to be changed, the processor 120 may perform an operation of maintaining the camera driving information and changing the display driving information. If the display driving information is deemed to be maintained, the processor 120 may identify the display driving information set in the display module and may identify the off-duty time of the duty cycle determined by the set display driving information. The processor 120 may change (or configure) the camera driving information, based on the identified off-duty time. For example, the processor 120 may change the shutter speed included in the camera driving information to be identical to or smaller than the off-duty time so as to prevent the occurrence of light interference of the display module during the on-duty time. For example, if the refresh rate included in the display driving information is 120 Hz, and if the duty ratio is 50%, the value of the off-duty time may be 4.17 ms. The electronic device may maintain the value of the off-duty time to be 4.17 ms and may change the shutter speed to 1/500 sec (2 ms) so as to have an identical value or a smaller value, based on 4.17 ms. The processor 120 may control camera driving so as to capture an image, based on the changed camera driving information (for example, at a shutter speed of 1/500 sec (2 ms)).

According to an embodiment, the processor 120 may compare the value of the identified shutter speed and the value of the off-duty time of the duty cycle and may change the camera driving information such that, if the shutter speed is larger than the off-duty time, the off-duty time of the duty cycle of the display module 160 becomes larger than the shutter speed. The processor 120 may maintain the display driving information and may change a necessary camera parameter (for example, at least one of the shutter speed, the ISO, or the aperture value) included in the camera driving information such that an image is captured with an optimal image quality. For example, if the configures refresh rate is 120 Hz, and if the duty ratio is 50%, the processor 120 may change the shutter speed (for example, 1/125 sec (8 ms)) set in the camera 210 to a shorter time (for example, 1/250 (4 ms) or 1/500 (2 ms)), and may change the set ISO value (for example, 100) to a higher value (for example, 200). For example, if the duty ratio is 50%, the off-duty time may be 4.17 ms.

According to an embodiment, the processor 120 may determine the image capture timing (image capture timepoint) of the camera 210 for capturing an image after the camera driving information of the camera 210 is changed, and may control the camera 210 to capture an image at the set shutter speed (for example, 1/500 sec (2 ms)) at the determined image capture timing, based on the changed camera driving information. If the value of the off-duty time of the duty cycle is larger than the value of the shutter speed (for example, 1/500 sec (2 ms)), the processor 120 may determine an image capture timing for starting a shutter operation during the off-duty time.

According to an embodiment, the processor 120 may identify a screen region 220 of the display module 160 corresponding to the region in which the camera 210 is disposed, and may control the refresh rate with regard to each sensor line (sensor array) such that the refresh rate of only pixels of a sensor line in the identified screen region 220. For example, assuming that the refresh rate is 120 Hz, the duty ratio is 50%, the peripheral environment is a dark indoor environment, and the shutter speed of the camera necessary for image capture by the camera is 1/30 sec, the processor 120 may identify that the refresh rate needs to be changed to 33.3 ms, based on the shutter speed. The processor 120 may change the refresh rate to 15 Hz value by calculating a value corresponding to 33.3 ms (for example, (1000/15)*0.5=33.3 ms). Since a change in the refresh rate results in a flickering phenomenon, the processor 120 may configure a low refresh rate at the set image capture timing with regard to only sensor lines related to the camera, and may maintain the set refresh rate (for example, 120 Hz) with regard to sensor lines in the remaining region. Accordingly, the electronic device may minimize the flickering phenomenon visible to the user's eyes.

According to an embodiment, the processor 120 may identify a screen region 220 of the display module 160 corresponding to the region in which the camera 210 is disposed, and may control pixels of a peripheral region 230 expanded from the screen region 220 as black only when capturing an image (image capture timing), thereby increasing the off-duty time. The processor 120 may control both the on-duty time and the off-duty time of the duty cycle corresponding to the image capture timing as black, based on the camera shutter speed (for example, 1/60 sec (16.7 ms)), such that no light is emitted during these times, thereby obtaining an advantage in that, by increasing the off-duty time, the refresh rate is decreased only at the image capture timing. The processor 120 may maintain the set refresh rate (for example, 120 Hz) in regions other than the peripheral region 230.

According to an embodiment, the processor 120 may change the duty ratio of the duty cycle so as to change the off-duty time. For example, the processor 120 may increase (or adjust) the duty ratio if the value (for example, 5.8 ms)

of the off-duty time according to the set duty ratio (for example, 30%) is equal to/larger than the value (for example, 4.17 ms) of the off-duty time set according to the refresh rate (for example, 120 Hz). For example, the set duty ratio may be 50% at a refresh rate of 120 Hz, and the processor 120 may thus change the duty ratio to 50% or higher if the refresh rate is maintained at 120 Hz, thereby reducing the off-duty time to a value of 4.17 ms or less.

According to an embodiment, considering that the peak (amplitude) of a light-emitting timepoint (on-duty timepoint) of a pixel at a duty cycle and the peak (amplitude) of a non-light-emitting timepoint (off-duty timepoint) may have a slope, the processor 120 may adjust the shutter operation image capture timing so as to conform to a fully off timepoint, excluding the slope range, even during the off-duty time.

At least some of the operations of the processor according to an embodiment described above may be performed by an image signal processor (ISP). For example, the ISP may be included in the camera module 180 and/or the processor 120.

Referring to FIGS. 1 and 2, a memory 130 of the electronic device 101 according to an embodiment may store commands (for example, instructions) set such that operations executed by the processor are performed. The at least one processor 120 may execute the commands stored in the memory 130.

As such, in an embodiment, major components of the electronic device have been described with reference to the electronic device 101 in FIGS. 1, 2, and 3. However, in various embodiments, not all components illustrated in FIGS. 1, 2, and 3 are essential components, and the electronic device 101 may be implemented by more components than illustrated therein or by less components than illustrated therein. In addition, the position of major components of the electronic device 101 described above with reference to FIGS. 1, 2, and 3 may be changed according to various embodiments.

According to an embodiment, an electronic device (for example, the electronic device 101 in FIGS. 1 and 2) may include a display module (for example, the display module 160 in FIGS. 1, 2, and 3), a camera (for example, the camera module 180 in FIG. 1, the camera 210 in FIGS. 2 and 3) disposed on a rear surface of the display module, a memory (for example, the memory 130 in FIG. 1), and at least one processor (for example, the processor 120 in FIG. 1) electrically connected to the display module, the camera, and the memory. The at least one processor may be configured to identify camera driving information set with regard to the camera, identify a shutter speed included in the set camera driving information, change display driving information set such that the time of a non-light-emitting interval of a duty cycle of the display module is larger than the shutter speed, and control driving of the camera, based on the changed display driving information.

According to an embodiment, the at least one processor may be configured to configure an capture timing of the camera within the time of the non-light-emitting interval or change the set image capture timing, and provide a synchronization signal for synchronization between the display module and the camera to each of the display module and the camera to start image capturing of the camera at the image capture timing within the non-light-emitting interval, and the synchronization signal may be generated based on information regarding the time of the non-light-emitting interval and the image capture timing.

According to an embodiment, the camera driving information may include the shutter speed, the display driving information may include at least one of a refresh rate, a duty cycle, or a duty ratio, and the at least one processor may be configured to control the camera to be driven based on the identified shutter speed within the time of a non-light-emitting interval changed according to the changed display driving information, and control the camera not to be driven during the time of the duty cycle light-emitting interval.

According to an embodiment, the at least one processor may be configured to identify whether to change or maintain the set display driving information, based on the shutter speed and the time of the non-light-emitting interval.

According to an embodiment, the at least one processor may be configured to identify that the set display driving information needs to be changed and, in case that the shutter speed value is larger than the time value of the non-light-emitting interval, change the refresh rate included in the display driving information such that the time of the non-light-emitting interval is larger than the shutter speed, and the time of the non-light-emitting interval may be changed according to a change in the refresh rate.

According to an embodiment, the at least one processor may be configured to identify that the set display driving information needs to be changed and, in case that the shutter speed value is larger than the time value of the non-light-emitting interval, change the duty ratio of the duty cycle such that the time of the non-light-emitting interval is larger than the shutter speed, and the time of the non-light-emitting interval may be changed according to a change in the duty ratio.

According to an embodiment, the at least one processor may be configured to maintain the set display driving information in case that the set display driving information is identified to be maintained, and change the camera driving information, based on the set display driving information.

According to an embodiment, the at least one processor may be configured to identify that the set display driving information is to be maintained and, in case that the shutter speed value is larger than the time value of the non-light-emitting interval, maintain the set display driving information, and change the camera driving information, based on the set display driving information.

According to an embodiment, the at least one processor may be configured to change a refresh rate of pixels of a pixel line in a first region of the display corresponding to a region in which the camera is disposed, and maintain a refresh rate of pixels of a remaining region excluding the first region to be a configured refresh rate included in the display driving information.

According to an embodiment, the at least one processor may be configured to control pixels in a first region of the display corresponding to a region in which the camera is disposed at a timepoint at which the image is captured and in a second region including a peripheral region of the first region as black such that the pixels do not emit light, and maintain display driving information of pixels in a remaining region excluding the second region to be the configured display driving information.

Figure 5:
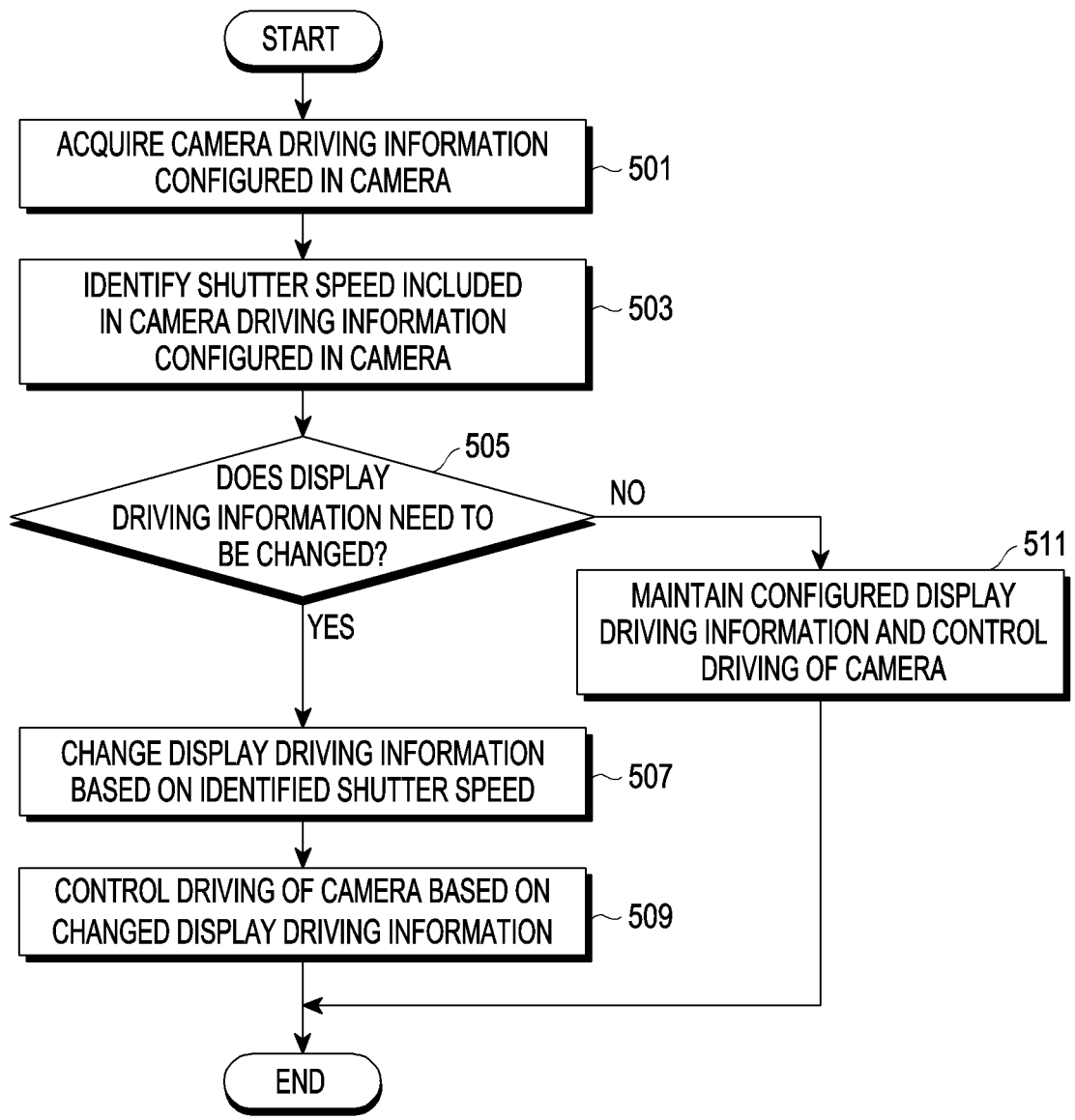
FIG. 5 illustrates an example of a method for operating an electronic device according to an embodiment of the disclosure.

FIG. 5 illustrates an example of a method for operating an electronic device according to an embodiment of the disclosure.

The method for operating an electronic device according to an embodiment (for example, the electronic device 101 in FIGS. 1 and 2) described with reference to FIG. 5 may be performed by a processor or an ISP, for example.

Referring to FIG. 5, the electronic device may acquire camera driving information configured in a camera (the camera 210 in FIGS. 2 and 3), in operation 501. For example, the camera driving information may include at least one of a shutter speed related to driving of the camera 210, an ISO sensitivity, and an aperture value (F). The camera driving information may include various other parameters related to driving of the camera 210.

In operation 503, the electronic device may identify a shutter speed included in the camera driving information set in the camera 210. The electronic device may identify an off-duty time of a duty cycle determined by display driving information set to be compared with the shutter speed. For example, the display driving information may include a refresh rate, a duty rate, and a duty cycle. The display driving information may include various other parameters related to driving of the display module 160.

In operation 505, the electronic device may confirm, based on the identified shutter speed, whether the display driving information needs to be changed. The electronic device 101 may compare the identified shutter speed and the off-duty time identified by the display driving information, thereby confirming whether the shutter speed value exceeds the value of the off-duty time.

If it is confirmed in operation 505 that the shutter speed value exceeds the value of the off-duty time, the electronic device may identify that the display needs to be changed (Yes in operation 505), and may change the set display driving information, based on the shutter speed included in the camera driving information, such that no light interference occurs, because the shutter speed is larger than the off-duty time, in operation 507. The electronic device may maintain the shutter speed of the camera and may change at least one of the refresh rate, the duty cycle, or the duty ratio included in the display driving information, based on the shutter speed.

In operation 509, the electronic device 101 may control driving of the camera so as to capture an image at the identified shutter speed, based on the changed display driving information. The camera may capture an image at a set image capture timing without light interference during the off-duty time of the duty cycle changed according to the changed display driving information.

If it is confirmed in operation 505 that the shutter speed value is equal to/lower than the value of the off-duty time, the electronic device may identify that there is no need to change the display driving information (No in operation 505). In operation 511, the electronic device may maintain the configured display driving information (for example, refresh rate, duty cycle, and/or duty ratio) with no change. Without changing the configured display driving information, the electronic device may control driving of the camera so as to capture an image according to the identified shutter speed, based on the configured display driving information. Since the off-duty time of the duty cycle determined by the configured display driving information is longer than the identified shutter speed, the camera may capture an image at the configured image capture timing without light interference during the off-duty time.

Figure 6A:
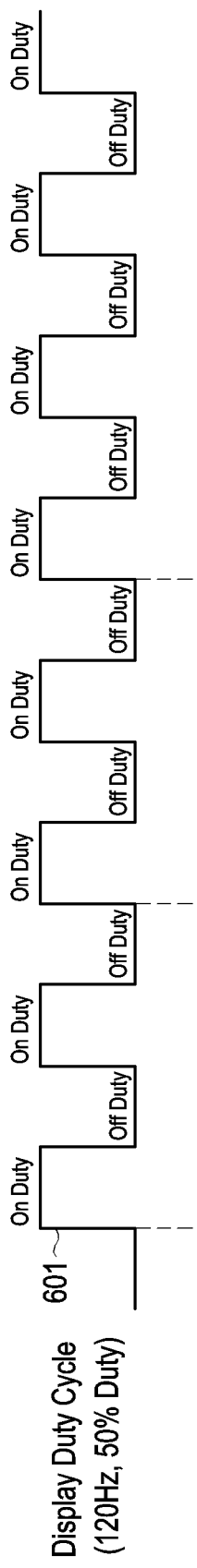
FIGS. 6A, 6B, and 6C illustrate an example of a duty cycle and a camera driving cycle in an electronic device according to various embodiments of the disclosure.
Figure 6B:
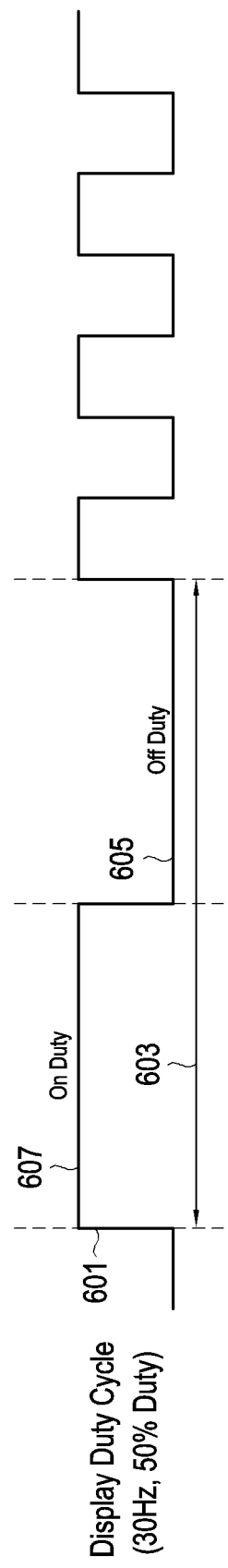
Figure 6C:
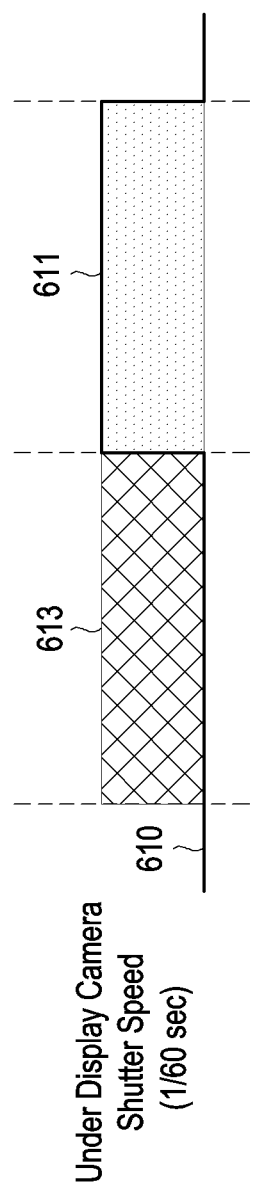

FIGS. 6A, 6B, and 6C illustrate an example of a duty cycle and a camera driving cycle in an electronic device according to various embodiments of the disclosure.

Figure 7:
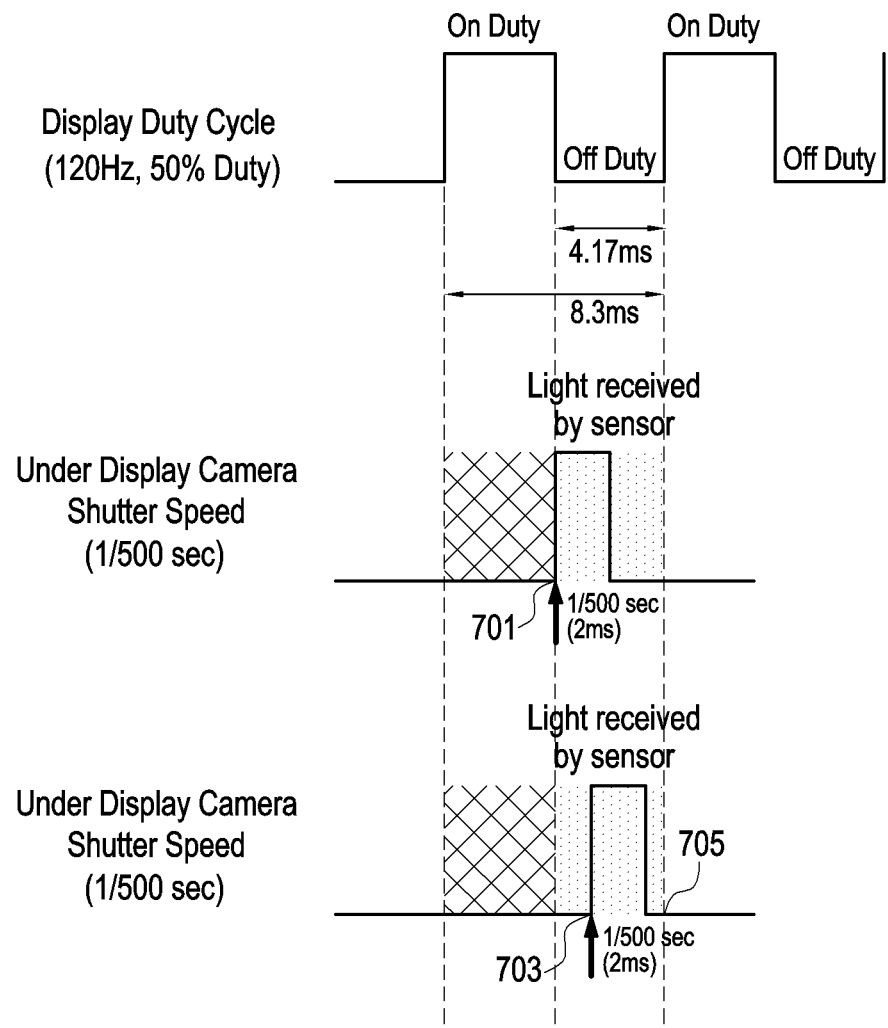
FIG. 7 illustrates an example of a duty cycle and a camera driving cycle in an electronic device according to an embodiment of the disclosure.

FIG. 7 illustrates an example of a duty cycle and a camera driving cycle in an electronic device according to an embodiment of the disclosure.

Referring to FIGS. 5, 6A, 6B, and 6C, an electronic device according to an embodiment may identify that a shutter speed value included in camera driving information set in a camera (for example, the camera 210 in FIGS. 2 and 3) is 1/60 sec (16.7 ms), for example, may identify that a refresh rate included in set display information is 120 Hz, for example, and may identify that the duty ratio of a duty cycle 601 is 50%, for example, as illustrated in FIG. 6A. If the refresh rate 120 Hz, if the duty ratio is 50%, the electronic device, and if one frame of the duty cycle 601 is described as four duties (on, off, on, off), for example, the electronic device may identify that the value of the on-duty time and the off-duty time is 4.17 ms. If it is confirmed in operation 505 in FIG. 5 that the shutter speed value exceeds the off-duty time value, the electronic device may identify that there is a need to change the display driving information. Accordingly, the electronic device may change the refresh rate to 30 Hz, for example, and maintain the duty ratio at 50%, based on the value of the shutter speed being 1/60 sec (16.7 ms), such that the off-duty time value becomes equal to/larger than the shutter speed value. Referring to FIG. 6B, the electronic device may change a time 603 of one period of the duty cycle 601 as the refresh rate is changed. For example, as the refresh rate is decreased to 30 Hz as illustrated in FIGS. 6A, 6B, and 6C, the time 603 of one period may be increased to 33.3 ms, and an off-duty time 605 may be increased to 16.7 ms. The pitch value (amplitude) may be decreased as the time 603 of one period is increased in the duty cycle 601. The electronic device may identify that the off-duty time 605 of 16.7 ms is equal to (or larger than) the camera shutter speed value of 1/60 sec (16.7 ms), as illustrated in FIG. 6B.

Referring to FIG. 6B, the electronic device may control driving of the camera, like a driving cycle 610 of the camera, in response to the off-duty time 605 of the duty cycle 601 and an on-duty time 607 thereof. Since no light interference occurs due to the display module during the off-duty time 605 of the duty cycle 601, the camera may be driven according to the shutter speed (for example, 1/60 sec (16.7 ms)) set in a time interval 611 of the driving cycle 610 corresponding to the off-duty time 605, as illustrated in FIG. 6C. Since light interference occurs due to the display module during the on-duty time 607 of the duty cycle 601, the camera may not be drive in a time interval 613 of the driving cycle 610 corresponding to the on-duty time 607, as illustrated in FIG. 6C.

According to an embodiment, the electronic device may configure an image capture timing (camera driving timepoint) such that an image is captured at the camera shutter speed (for example, 1/60 sec (16.7 ms)) during the increased off-duty time 605 (for example, 16.7 ms). For example, if the off-duty time 605 (for example, 16.7 ms) is increased according to the shutter speed (for example, 1/60 sec(16.7 ms)), the image capture timing may be set to be a timepoint at which pixels are changed off duty because the two values are identical (or have an insignificant difference).

According to an embodiment, as illustrated in FIG. 7, if the camera shutter speed has a value (for example, 1/500 sec (2 ms)) smaller than the off-duty time (for example, 4.17 ms), the electronic device may change and configure the capture timing of the camera during the off-duty time (for example, 4.17 ms). For example, if the image capture timing is set at a timepoint 701 of initial change to the off-duty time, a changed image capture timing may be set at a timepoint 703 after a predetermined period of time from the timepoint 701 of change to the off-duty time. The changed image capture timing may be adjusted within a range such that the shutter speed (for example, 1/500 sec (2 ms)) does not deviate from a timepoint 705 at which another on-duty time begins.

An electronic device according to an embodiment may identify that a shutter speed value included in camera driving information set in a camera (for example, the camera

210 in FIGS. 2 and 3) is 1/60 sec (16.7 ms), for example, and may identify that a refresh rate included in set display driving information is 120 Hz, for example. Provided that one frame of a duty cycle is described as four duties (on, off, on, off), the electronic device may identify that the value of the on-duty time and the off-duty time is 4.17 ms. The electronic device may change the duty cycle to two duties (for example, on, off), for example, so as to secure the off-duty time. For example, if the refresh rate is maintained at 120 Hz, and if the duty cycle is changed to two duties, the off-duty time may be increased to 8.3 ms.

Figure 8:
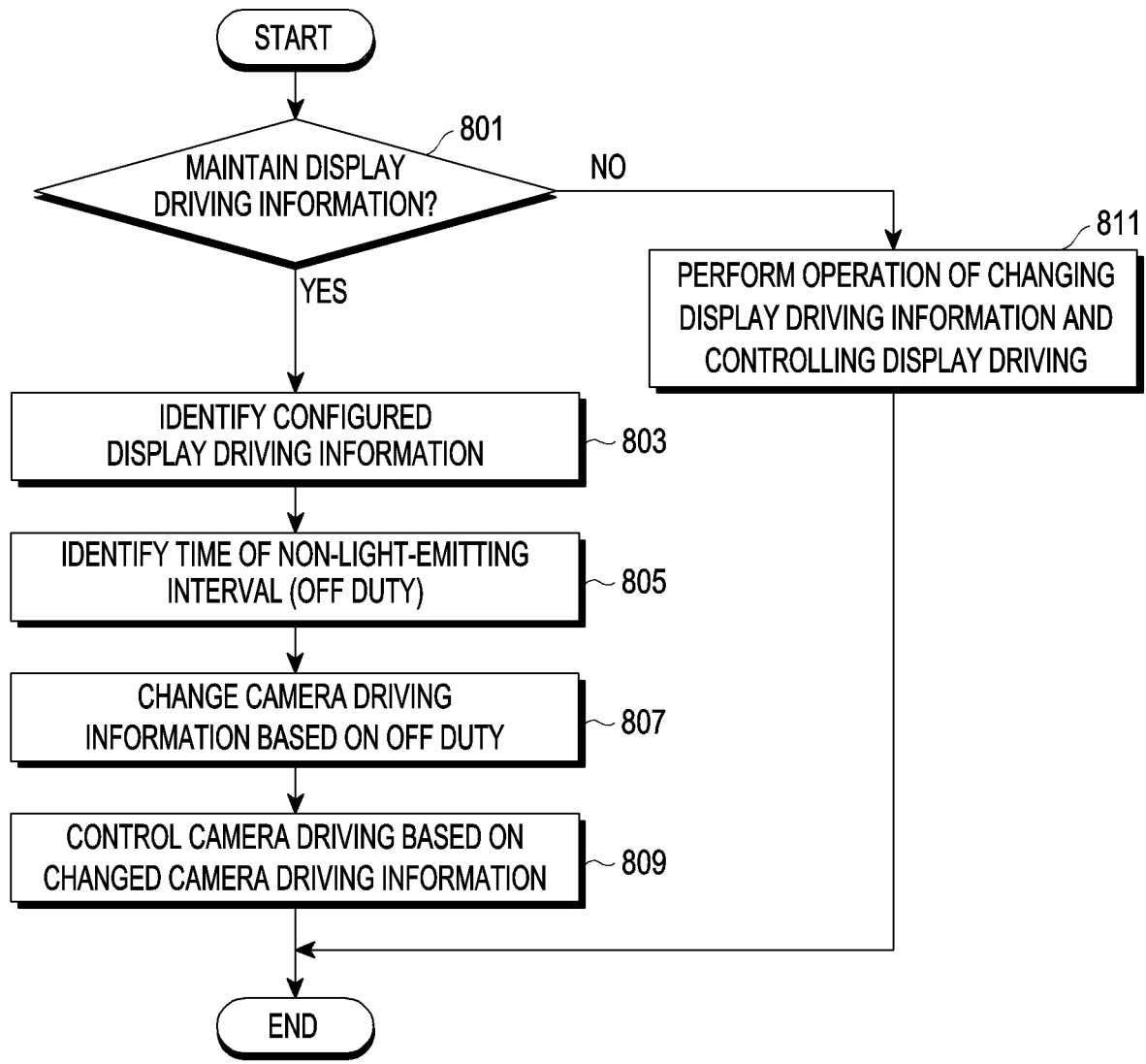
FIG. 8 illustrates an example of a method for operating an electronic device according to an embodiment of the disclosure.

FIG. 8 illustrates an example of a method for operating an electronic device according to an embodiment of the disclosure.

Figure 9:
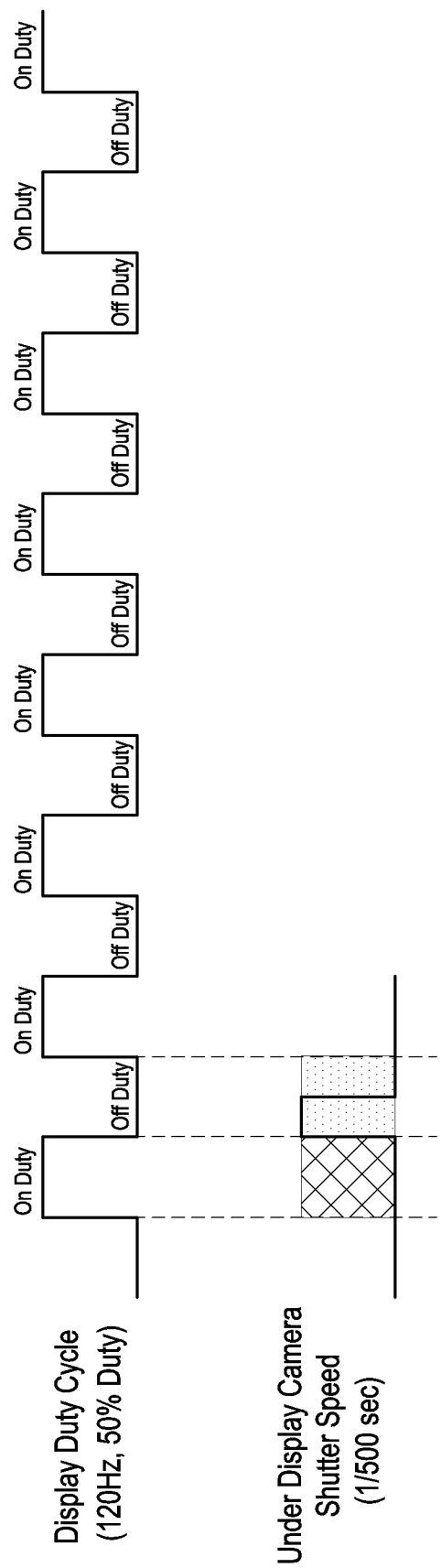
FIG. 9 illustrates an example of a duty cycle and a camera driving cycle in an electronic device according to an embodiment of the disclosure.

FIG. 9 illustrates an example of a duty cycle and a camera driving cycle in an electronic device according to an embodiment of the disclosure.

Referring to FIGS. 8 and 9, an electronic device (for example, the electronic device 101 in FIGS. 1 and 2) according to an embodiment may prioritize maintaining display driving information according to the situation or peripheral environment. Accordingly, the electronic device may perform an operation of maintaining display driving information and changing camera driving information, as illustrated in FIG. 8. For example, the camera driving information may include a shutter speed related to driving of the camera 210, an ISO sensitivity, and an aperture value (F). The camera driving information may include various other parameters related to driving of the camera 210. The method for operating an electronic device according to an embodiment. Described with reference to FIG. 8 may be performed by a processor or an ISP, for example. Referring to FIG. 8, the electronic device may confirm whether or not to maintain display driving information, in operation 801. If the display driving information is confirmed to be maintained (Yes in operation 801), the electronic device may perform operation 803. If the display driving information is confirmed to be changed (No in operation 801), the electronic device may perform operation 811.

In operation 803, the electronic device may identify display driving information set in a display module.

In operation 805, the electronic device may identify the off-duty time of a duty cycle determined by the set display driving information. For example, the display driving information may include a refresh rate and a duty rate.

In operation 807, the electronic device may change (or configure) camera driving information, based on the identified off-duty time. For example, the electronic device may change the shutter speed included in the camera driving information to be identical to or smaller than the off-duty time so as to avoid light interference of a display module occurring during the on-duty time. For example, as illustrated in FIG. 9, if the refresh rate included in the display driving information is 120 Hz, and if the duty ratio is 50%, the value of the off-duty time may be 4.17 ms. The electronic device may maintain the value of the off-duty time at 4.17 ms and may change (or configure) the camera shutter speed so as to have an identical value or a smaller value, based on 4.17 ms. For example, as illustrated in FIG. 9, the camera shutter speed value may be changed to 1/500 sec (2 ms).

In operation 809, the electronic device may control driving of the camera so as to capture an image, based on the changed camera driving information. For example, as illustrated in FIG. 9, the camera may be driven at the changed shutter speed (for example, 2 ms) during the set off-duty time (for example, 4.17 ms) of the duty cycle, thereby capturing an image.

In operation 811, the electronic device may perform an operation of changing the display driving information and controlling display driving (for example, the operating method described above with reference to FIG. 5). For example, the electronic device may display a UI for changing the display driving information, in operation 811, and may then perform the operating method described above with reference to FIG. 5 in response to a user request.

Figure 10:
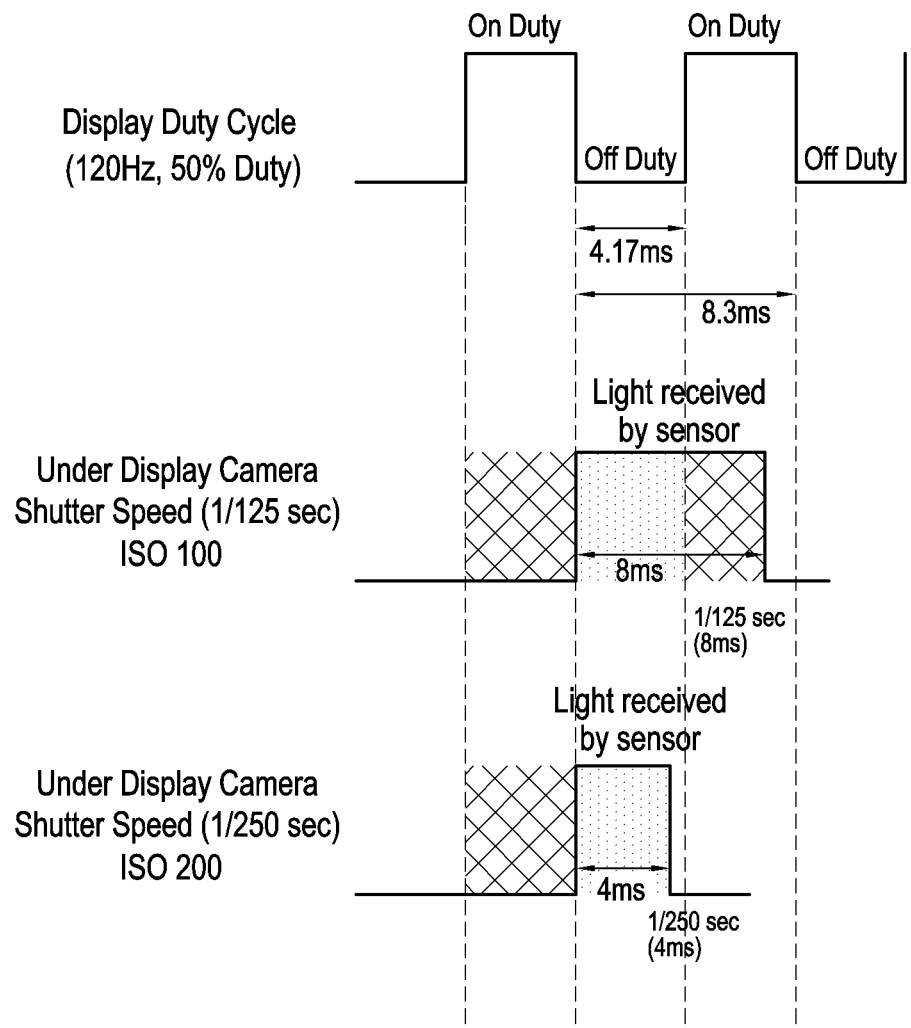
FIG. 10 illustrates an example of a duty cycle and a camera driving cycle in an electronic device according to an embodiment of the disclosure.

FIG. 10 illustrates an example of a duty cycle and a camera driving cycle in an electronic device according to an embodiment of the disclosure.

Referring to FIGS. 8 and 10, prior to performing operation 807 after performing operation 801 to operation 805, the electronic device may further perform an operation of confirming whether the camera driving information set with regard to the camera needs to be changed. The electronic device may compare the set shutter speed included in the camera driving information and the off-duty time identified by the display driving information, thereby confirming whether the shutter speed value exceeds the off-duty time value. As illustrated in FIG. 10, the shutter speed value (for example, 1/125 sec(8 ms)) exceeds the value (for example, 4.17 ms) of the off-duty time identified by the display driving information, and the electronic device may thus change the camera driving information, based on the value (for example, 4.17 ms) of the off-duty time. For example, the electronic device may change the shutter speed value to a value (for example, 1/250 sec) lower than a set value (for example, 1/125 sec), and may change the ISO value to a value (for example, 200) higher than a set value (for example, 100). The electronic device may identify that a sensor light-receiving interval for image capture by the camera corresponding to the speed value (for example, 4 ms) changed by changing the shutter speed value and/or ISO value is changed to fall within the off-duty time.

Figure 11:
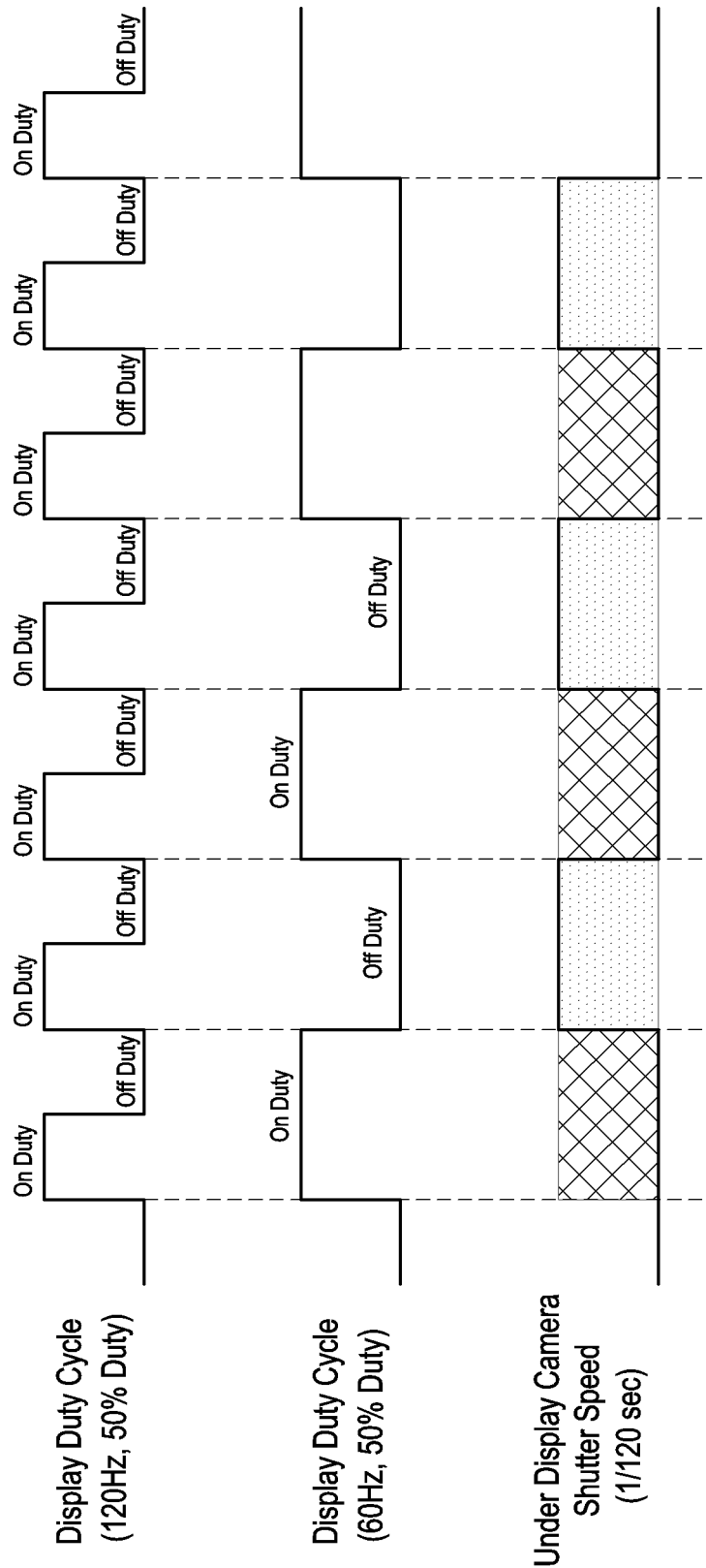
FIG. 11 illustrates an example of a duty cycle and a camera driving cycle in an electronic device according to an embodiment of the disclosure.

FIG. 11 illustrates an example of a duty cycle and a camera driving cycle in an electronic device according to an embodiment of the disclosure.

Referring to FIG. 11, an electronic device according to an embodiment may identify a screen region (for example, the screen region 220 in FIG. 2) of a display module (for example, the display module 160 in FIGS. 1, 2, and 3) corresponding to a region in which a camera (for example, the camera 210 in FIGS. 2 and 3) is disposed, and may control the refresh rate with regard to each sensor line (sensor array), thereby decreasing the refresh rate with regard to only pixels of a sensor line of the identified screen region 220. For example, assuming that the refresh rate is 120 Hz, the duty ratio is 50%, the peripheral environment is a dark indoor environment, and the shutter speed of the camera necessary for image capture by the camera is 1/120 sec, as illustrated in FIG. 11, the electronic device may identify that the refresh rate needs to be changed to 8.3 ms, based on the shutter speed. The electronic device may change the refresh rate to 60 Hz value by calculating a value corresponding to 33.3 ms (for example, (1000/60)*0.5=8.3 ms). Since a change in the refresh rate results in a flickering phenomenon, the electronic device may configure a low refresh rate at the set capture timing with regard to only sensor lines related to the camera, and may maintain the set refresh rate (for example, 120 Hz) with regard to sensor lines in the remaining region. Accordingly, the electronic device may minimize the flickering phenomenon visible to the user's eyes.

Figure 12:
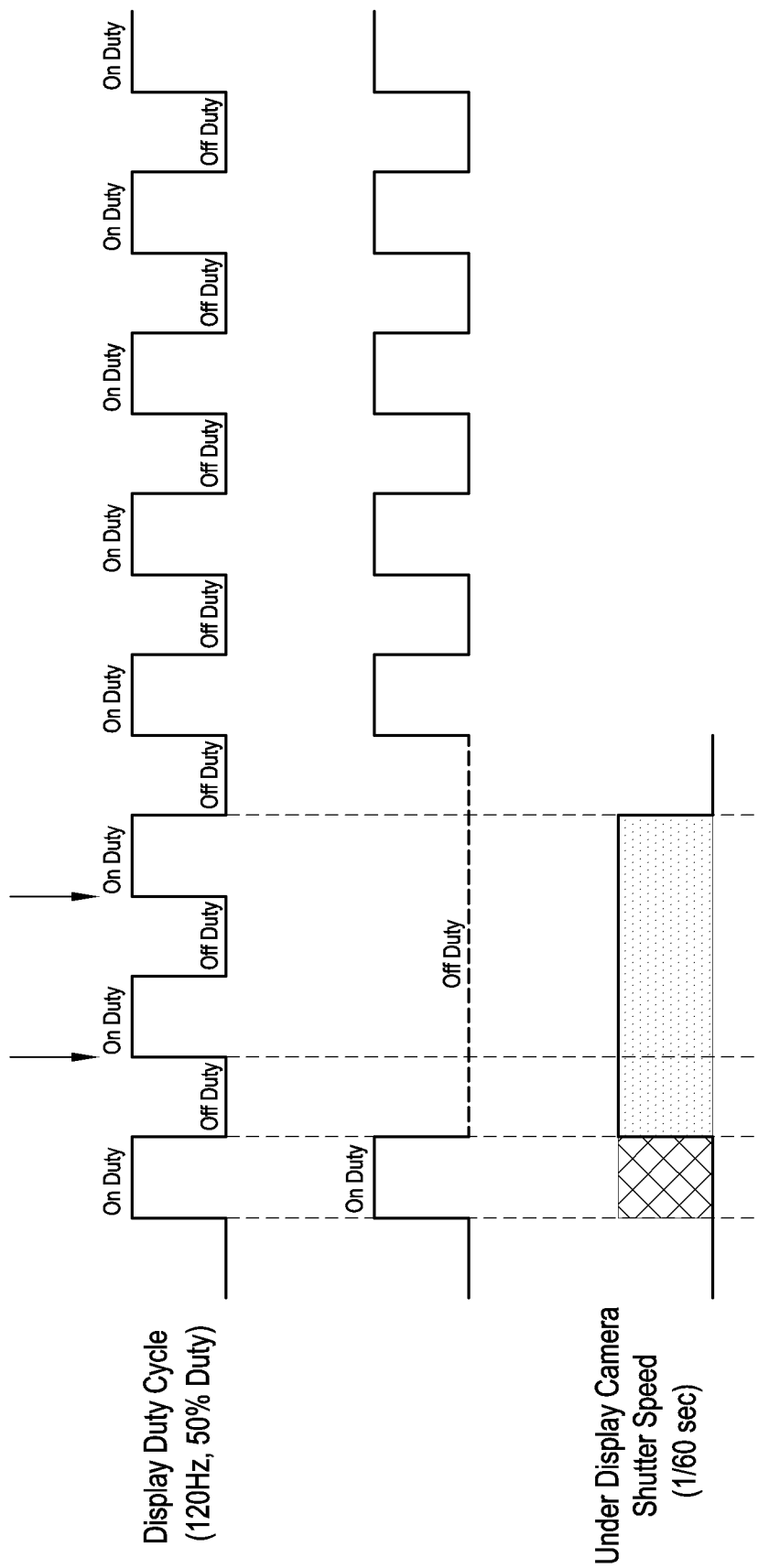
FIG. 12 illustrates an example of a duty cycle and a camera driving cycle in an electronic device according to an embodiment of the disclosure.

FIG. 12 illustrates an example of a duty cycle and a camera driving cycle in an electronic device according to an embodiment of the disclosure.

Referring to FIG. 12, an electronic device according to an embodiment may identify a screen region (for example, the screen region 220 in FIG. 2) of a display module (for example, the display module 160 in FIGS. 1, 2, and 3) corresponding to a region in which a camera (for example, the camera 210 in FIGS. 2 and 3) is disposed, and may control pixels of a peripheral region (for example, the peripheral region 230 in FIG. 2) expanded from the screen region as black only when capturing an image (image capture timing), thereby increasing the off-duty time. The electronic device may control both the on-duty time and the off-duty time of the duty cycle corresponding to the image capture timing as black, based on the camera shutter speed (for example, 1/60 sec (16.7 ms)), such that no light is emitted during these times, thereby obtaining an advantage in that, by increasing the off-duty time, the refresh rate is decreased only at the image capture timing. The electronic device may maintain the set refresh rate (for example, 120 Hz) in regions other than the peripheral region 230.

Figure 13:
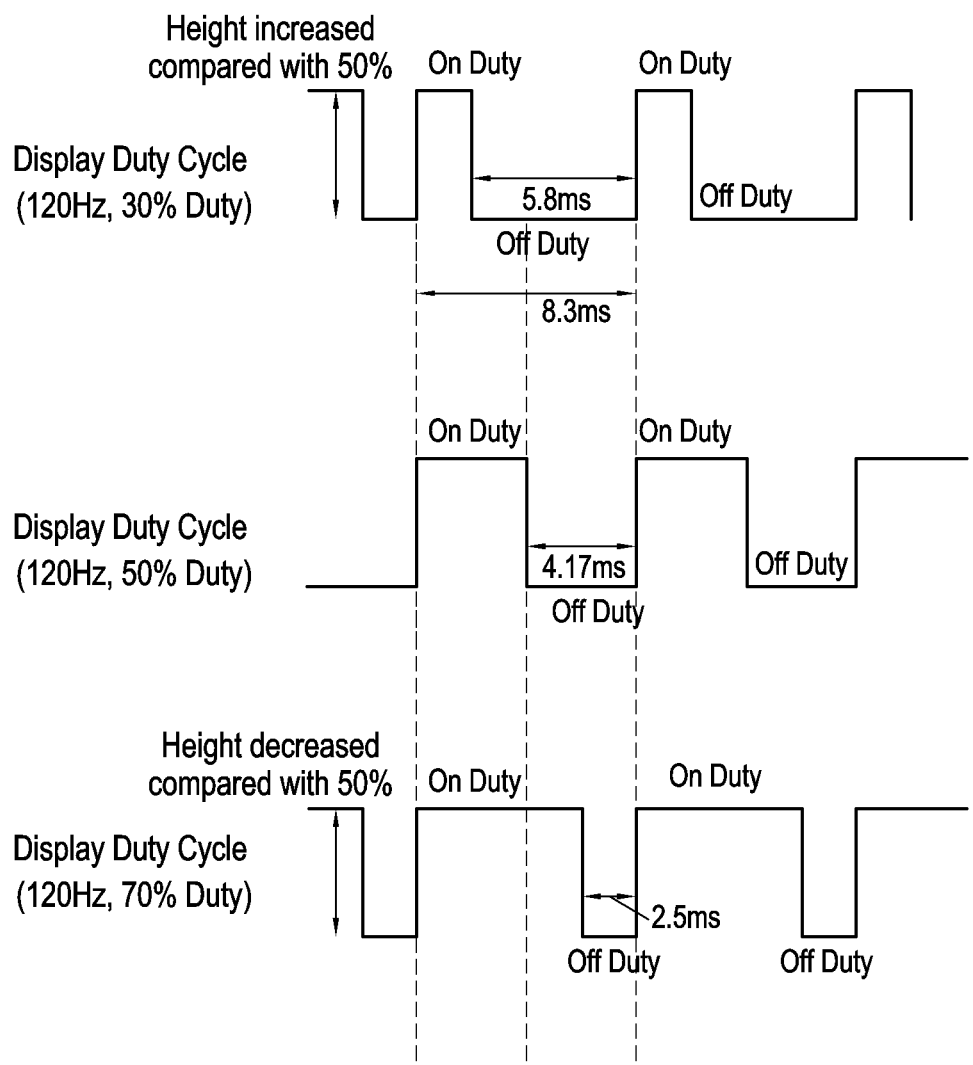
FIG. 13 illustrates an example of a duty cycle and a camera driving cycle in an electronic device according to an embodiment of the disclosure.

FIG. 13 illustrates an example of a duty cycle and a camera driving cycle in an electronic device according to an embodiment of the disclosure.

Referring to FIG. 13, an electronic device according to an embodiment may change the duty ratio of the duty cycle, thereby changing the off-duty time. For example, the duty ratio may be changed according to the operating method for changing display driving information described with reference to FIG. 5, and camera driving may be controlled based on the changed duty ratio. For example, the electronic device may increase (or adjust) the duty ratio if the value (for example, 5.8 ms) of the off-duty time according to the set duty ratio (for example, 30%) is equal to/larger than the value (for example, 4.17 ms) of the off-duty time set according to the refresh rate (for example, 120 Hz), as illustrated in FIG. 13. For example, the duty ratio may be set to be 50% at a refresh rate of 120 Hz, as illustrated in FIG. 13, and the electronic device may thus change the duty ratio to 50% or higher if the refresh rate is maintained at 120 Hz, thereby decreasing the off-duty time to a value of 4.17 ms or less.

Figure 14:
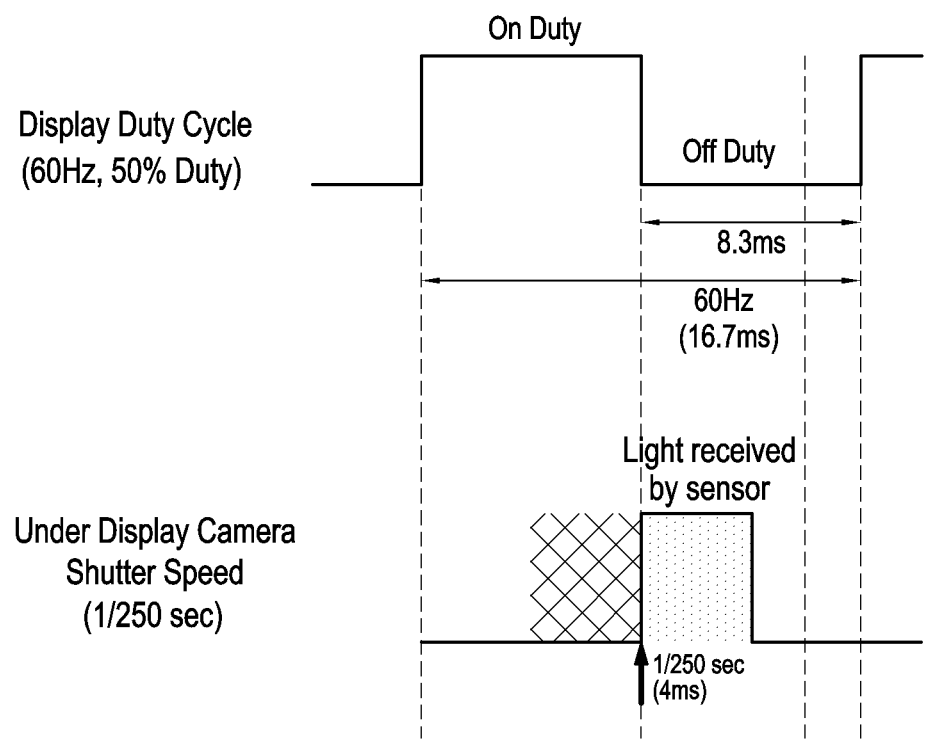
FIG. 14 illustrates an example of a duty cycle and a camera driving cycle in an electronic device according to an embodiment of the disclosure.

FIG. 14 illustrates an example of a duty cycle and a camera driving cycle in an electronic device according to an embodiment of the disclosure.

Referring to FIG. 14, according to an embodiment, a processor 120 of an electronic device may adjust the shutter operating image capture timing so as to conform to a fully off timepoint even during the off-duty time. The electronic device may calculate the off-duty time according to the fully off timepoint. This may require a prerequisite. For example, the prerequisite may include at least one condition among synchronization (Delay) between the off-duty time and the light-receiving operation of the camera sensor, interworking (interface) between a camera I2C signal and a refresh rate changing operation, selection of a condition (for example, maintaining display driving information or maintaining camera driving information) that is prioritized according to the situation or peripheral environment, an operation of the camera similar to shutter speed changing (shutter preferential mode), or an image capture mode that allows only a shutter speed corresponding to a specific time or longer according to the refresh rate of the display module (for example, images can be taken without restrictions in a daylight situation in which the shutter speed is sufficiently high).

According to another embodiment, depending on the display module type, the duty cycle may have a slope (for example, slow rate characteristics) at a peak (amplitude) of a light-emitting timepoint (on-duty timepoint) of a pixel and at a peak (amplitude) of a non-light-emitting timepoint (off-duty timepoint). An effective image capture timing in a fully off case may vary according to the slope in an interval in which a slope occurs during the off-duty time. The electronic device may calculate the off-duty time according to the fully off timepoint in view of the degree of the slope.

According to an embodiment, a method for operating an electronic device (for example, the electronic device 101 in FIGS. 1 and 2) may include an operation of identifying camera driving information set with regard to a camera disposed on a rear surface of a display module of the electronic device, an operation of identifying a shutter speed included in the set camera driving information, an operation of changing set display driving information such that the time of a non-light-emitting interval of a duty cycle of the display module is larger than the shutter speed, and an operation of controlling driving of the camera, based on the changed display driving information.

According to an embodiment, the method may further include an operation of configuring an image capture timing of the camera within the time of the non-light-emitting interval or changing the set image capture timing, and an operation of providing a synchronization signal for synchronization between the display module and the camera to each of the display module and the camera to start image capturing of the camera at the image capture timing within the non-light-emitting interval, and the synchronization signal may be generated based on information regarding the time of the non-light-emitting interval and the image capture timing.

According to an embodiment, the camera driving information may include the shutter speed, the display driving information may include at least one of a refresh rate, a duty cycle, or a duty ratio, and the method further include an operation of controlling the camera to be driven based on the identified shutter speed within the time of a non-light-emitting interval changed according to the changed display driving information, and an operation of controlling the camera not to be driven during the time of the duty cycle light-emitting interval.

According to an embodiment, the method may further include an operation of identifying whether to change or maintain the set display driving information, based on the shutter speed and the time of the non-light-emitting interval.

According to an embodiment, the operation of changing set display driving information may include an operation of identifying that the set display driving information needs to be changed and, in case that the shutter speed value is larger than the time value of the non-light-emitting interval, changing at least one of the refresh rate, the duty cycle, or the duty ratio included in the display driving information such that the time of the non-light-emitting interval is larger than the shutter speed, and the time of the non-light-emitting interval may be changed according to a change in the refresh rate.

According to an embodiment, the method may further include an operation of maintaining the set display driving information in case that the set display driving information is identified to be maintained, and changing the camera driving information, based on the set display driving information.

According to an embodiment, the method may further include an operation of identifying that the set display driving information is to be maintained and, in case that the shutter speed value is larger than the time value of the non-light-emitting interval, maintaining the set display driving information, and changing the camera driving information, based on the set display driving information.

According to an embodiment, the method may further include an operation of changing a refresh rate of pixels of a pixel line in a first region of the display corresponding to a region in which the camera is disposed, and maintaining a refresh rate of pixels of a remaining region excluding the first region to be a refresh rate included in the display driving information.

According to an embodiment, the method may further include an operation of controlling pixels in a first region of the display corresponding to a region in which the camera is disposed at a timepoint at which the image is captured and in a second region including a peripheral region of the first region as black such that the pixels in the first region and the second region do not emit light, and maintaining display driving information of pixels in a remaining region excluding the second region to be the set display driving information.

According to an embodiment, in connection with a non-transitory computer-readable storage medium in which one or more programs are stored, the one or more programs may include executable instructions which, when executed by a processor of an electronic device, cause the electronic device to execute the operations of identifying camera driving information set with regard to a camera disposed on a rear surface of a display module of the electronic device, identifying a shutter speed included in the set camera driving information, changing display driving information set such that the time of a non-light-emitting interval of a duty cycle of the display module is larger than the shutter speed, and controlling driving of the camera, based on the changed display driving information.

In addition, embodiments disclosed herein are presented to describe and understand disclosed technical content, and are not intended to limit the scope of technology disclosed herein. Therefore, the scope of the disclosure is to be interpreted as encompassing all changed or various other embodiments based on the technical idea of the disclosure.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   display circuitry;
   a camera disposed on a rear surface of the display circuitry;
   memory storing instructions; and
   at least one processor including processing circuitry,
   wherein the instructions, when executed by the at least one processor individually or collectively, cause the electronic device to:
     identify camera driving information set with regard to the camera,
     identify a shutter speed included in the set camera driving information,
     identify, based on the identified shutter speed, whether to change set display driving information,
     based on a value of the shutter speed being greater than a value of a time of a non-light-emitting interval of a duty cycle of the display circuitry, change at least one of a screen refresh rate, a duty cycle or a duty ratio included in the set display driving information, and
     based on the shutter speed, control a driving of the camera within the time of the non-light-emitting interval that has been changed to a value greater than the value of the shutter speed in response to the change in at least one of the screen refresh rate, the duty cycle or the duty ratio.

2. The electronic device of claim 1,
   wherein the instructions, when executed by the at least one processor, individually or collectively further cause the electronic device to:
     set an image capture timing of the camera within the changed time of the non-light-emitting interval or change the set image capture timing, and
     provide a synchronization signal for synchronization between the display circuitry and the camera to each of the display circuitry and the camera to start image capturing of the camera at the image capture timing within the non-light-emitting interval, and
   wherein the synchronization signal is generated based on information regarding the time of the non-light-emitting interval and the image capture timing.

3. The electronic device of claim 1,
   wherein the camera driving information comprises the shutter speed,
   wherein the display driving information comprises at least one of a refresh rate, a duty cycle, or a duty ratio,
   wherein, whether to change the set display driving information, is identified additionally based on the time of the non-light-emitting interval, and
   wherein the instructions, when executed by the at least one processor, individually or collectively further cause the electronic device to:
     control the camera to be driven based on the identified shutter speed within the time of the non-light-emitting interval changed according to the changed display driving information, and
     control the camera not to be driven during a time of a duty cycle light-emitting interval.

4. The electronic device of claim 3,
   wherein the instructions, when executed by the at least one processor, individually or collectively further cause the electronic device to:
     based on the value of the shutter speed being greater than the value of the time of the non-light-emitting interval of the duty cycle of the display circuitry, change at least one of the refresh rate or the duty ratio included in the set display driving information such that the value of the time of the non-light-emitting interval is larger than the value of the identified shutter speed, and
   wherein the time of the non-light-emitting interval is changed according to a change in the refresh rate or a change in the duty ratio.

5. The electronic device of claim 3, wherein the instructions, when executed by the at least one processor, individually or collectively further cause the electronic device to:
   based on the value of the shutter speed being less than or equal to the value of the time of the non-light-emitting interval of the duty cycle of the display circuitry, maintain the set display driving information, and
   based on the set display driving information, control the driving of the camera based on the shutter speed within the time of the non-light-emitting interval.

6. The electronic device of claim 1, further comprising:
   a display,
   wherein the instructions, when executed by the at least one processor, individually or collectively further cause the electronic device to:
     change a refresh rate of pixels of a pixel line in a first region of the display corresponding to a region in which the camera is disposed, and
     maintain the refresh rate of pixels of a remaining region excluding the first region to be a refresh rate included in the set display driving information.

7. The electronic device of claim 1, further comprising:
   a display,
   wherein the instructions, when executed by the at least one processor, individually or collectively further cause the electronic device to:
     control pixels in a first region of the display corresponding to a region in which the camera is disposed at a timepoint at which an image is captured and a second region comprising a peripheral region of the first region as black such that the pixels in the first region and the second region do not emit light, and
     maintain display driving information of pixels in a remaining region excluding the second region to be the set display driving information.

8. The electronic device of claim 1,
   wherein the camera comprises an under display camera (UDC),
   wherein at least a part of the camera is disposed under a display panel of the display circuitry, and
   wherein the camera is disposed between the display panel and a substrate.

9. The electronic device of claim 1, wherein the instructions, when executed by the at least one processor individually or collectively, further cause the electronic device to:
   change the identified shutter speed included in the set camera driving information to be identical to or smaller than an off-duty time to prevent an occurrence of light interference of the display circuitry during an on-duty time.

10. The electronic device of claim 9, wherein the instructions, when executed by the at least one processor, further cause the electronic device to:
based on the identified shutter speed, control both the on-duty time and the off-duty time of the duty cycle corresponding to an image capture timing as black such that no light is emitted during the on-duty time and the off-duty time.

11. A method performed by an electronic device, the method comprising:
identifying camera driving information set with regard to a camera disposed on a rear surface of display circuitry of the electronic device;
identifying a shutter speed included in the set camera driving information;
identifying, based on the identified shutter speed, whether to change set display driving information;
based on a value of the shutter speed being greater than a value of a time of a non-light-emitting interval of a duty cycle of the display circuitry, changing at least one of a screen refresh rate, a duty cycle or a duty ratio included in the set display driving information; and
based on the shutter speed, controlling a driving of the camera within the time of the non-light-emitting interval that has been changed to a value greater than the value of the shutter speed in response to the change in at least one of the screen refresh rate, the duty cycle or the duty ratio.

12. The method of claim 11, further comprising:
setting an image capture timing of the camera within the changed time of the non-light-emitting interval or changing the set image capture timing; and
providing a synchronization signal for synchronization between the display circuitry and the camera to each of the display circuitry and the camera to start image capturing of the camera at the image capture timing within the non-light-emitting interval,
wherein the synchronization signal is generated based on information regarding the time of the non-light-emitting interval and the image capture timing.

13. The method of claim 11,
wherein the camera driving information comprises the shutter speed,
wherein the display driving information comprises at least one of a refresh rate, a duty cycle, or a duty ratio,
wherein the identifying, of whether to change the set display driving information, is additionally based on the time of the non-light-emitting interval, and wherein the method further comprises:
controlling the camera to be driven based on the identified shutter speed within the time of the non-light-emitting interval changed according to the changed display driving information; and
controlling the camera not to be driven during a time of a duty cycle light-emitting interval.

14. The method of claim 13,
wherein the changing of the set display driving information comprises:
based on the value of the shutter speed being greater than the value of the time of the non-light-emitting interval of the duty cycle of the display circuitry, changing at least one of the refresh rate or the duty ratio included in the set display driving information such that the value of the time of the non-light-emitting interval is larger than the value of the identified shutter speed, and
wherein the time of the non-light-emitting interval is changed according to a change in the refresh rate or a change in the duty ratio.

15. The method of claim 13, further comprising:
based on the value of the shutter speed being less than or equal to the value of the time of the non-light-emitting interval of the duty cycle of the display circuitry, maintaining the set display driving information; and
based on the set display driving information, control the driving of the camera based on the shutter speed within the time of the non-light-emitting interval.

16. The method of claim 11, further comprising:
changing a refresh rate of pixels of a pixel line in a first region of a display of the electronic device, the first region corresponding to a region in which the camera is disposed; and
maintaining the refresh rate of pixels of a remaining region excluding the first region to be a refresh rate included in the display driving information.

17. The method of claim 11, further comprising:
controlling pixels in a first region of a display of the electronic device corresponding to a region in which the camera is disposed at a timepoint at which an image is captured and a second region comprising a peripheral region of the first region as black such that the pixels in the first region and the second region do not emit light; and
maintaining display driving information of pixels in a remaining region excluding the second region to be the set display driving information.

18. The method of claim 11, further comprising:
changing the identified shutter speed included in the set camera driving information to be identical to or smaller than an off-duty time to prevent an occurrence of light interference of the display circuitry during an on-duty time.

19. The method of claim 18, further comprising:
based on the identified shutter speed, controlling both the on-duty time and the off-duty time of the duty cycle corresponding to an image capture timing as black such that no light is emitted during the on-duty time and the off-duty time.

20. A non-transitory computer-readable storage medium storing instructions that, when executed by at least one processor of an electronic device individually or collectively, cause the electronic device to perform operations, the operations comprising:
identifying camera driving information set with regard to a camera disposed on a rear surface of display circuitry of the electronic device;
identifying a shutter speed included in the set camera driving information;
identifying, based on the identified shutter speed, whether to change set display driving information;
based on a value of the shutter speed being greater than a value of a time of a non-light-emitting interval of a duty cycle of the display circuitry, changing at least one of a screen refresh rate, a duty cycle or a duty ratio included in the set display driving information; and
based on the shutter speed, controlling a driving of the camera within the time of the non-light-emitting interval that has been changed to a value greater than the value of the shutter speed in response to the change in at least one of the screen refresh rate, the duty cycle or the duty ratio.

* * * * *